(12) United States Patent
Hosseini

(10) Patent No.: US 11,155,281 B2
(45) Date of Patent: Oct. 26, 2021

(54) VEHICLE GUIDANCE SYSTEM

(71) Applicant: Hyperloop Technologies, Inc., Los Angeles, CA (US)

(72) Inventor: Kaveh Hosseini, Pasadena, CA (US)

(73) Assignee: HYPERLOOP TECHNOLOGIES, INC., Los Angeles, CA (US)

(*) Notice: Subject to any disclaimer, the term of this patent is extended or adjusted under 35 U.S.C. 154(b) by 478 days.

(21) Appl. No.: 15/858,378

(22) Filed: Dec. 29, 2017

(65) Prior Publication Data

US 2018/0186389 A1 Jul. 5, 2018

Related U.S. Application Data

(60) Provisional application No. 62/440,155, filed on Dec. 29, 2016.

(51) Int. Cl.
| | |
|---|---|
| *B61F 5/22* | (2006.01) |
| *B60L 13/10* | (2006.01) |
| *B61F 5/38* | (2006.01) |
| *B61F 3/08* | (2006.01) |
| *B61B 13/08* | (2006.01) |

(Continued)

(52) U.S. Cl.
CPC .............. *B61F 5/22* (2013.01); *B60L 13/003* (2013.01); *B60L 13/08* (2013.01); *B60L 13/10* (2013.01); *B61B 13/08* (2013.01); *B61B 13/10* (2013.01); *B61B 13/12* (2013.01); *B61F 3/08* (2013.01); *B61F 5/38* (2013.01); *B61F 11/00* (2013.01)

(58) Field of Classification Search
CPC ...... B61F 5/22; B61F 5/52; B61F 5/40; B61F 5/38; B61F 3/08; B61F 11/00; B60L 13/003; B61B 13/08; B61B 13/10; E05B 25/12; E05B 25/34
See application file for complete search history.

(56) References Cited

U.S. PATENT DOCUMENTS

| | | | | |
|---|---|---|---|---|
| 3,238,894 | A * | 3/1966 | Maksim, Jr. ............. | B60V 3/04 104/121 |
| 3,626,857 | A * | 12/1971 | Omar ........................ | B61B 5/02 104/119 |

(Continued)

FOREIGN PATENT DOCUMENTS

| | | |
|---|---|---|
| CA | 2 988 649 | 12/2016 |
| CN | 203996231 | 12/2014 |

(Continued)

OTHER PUBLICATIONS

International Search Report conducted in counterpart Int'l Appln. No. PCT/US2017/068994, Form PCT/ISA/210 (dated Mar. 19, 2018).

(Continued)

*Primary Examiner* — Michael McCullough
(74) *Attorney, Agent, or Firm* — Greenblum & Bernstein P.L.C.

(57) ABSTRACT

Vehicle guidance system that includes a first guidance bogie selectively positionable in a first position for travel and a second position for direction change and a second guidance bogie selectively positionable in a third position for travel and a fourth position for direction change. At a common crossing, one of: the first guidance bogie is selectively positioned into the second position, or the second guidance bogie is selectively positioned into the fourth position.

25 Claims, 12 Drawing Sheets

(51) Int. Cl.
    *B61F 11/00*         (2006.01)
    *B60L 13/00*         (2006.01)
    *B61B 13/10*         (2006.01)
    *B61B 13/12*         (2006.01)
    *B60L 13/08*         (2006.01)

(56) References Cited

U.S. PATENT DOCUMENTS

| | | | | |
|---|---|---|---|---|
| 3,628,462 | A * | 12/1971 | Holt | E01B 25/26 104/105 |
| 3,738,281 | A * | 6/1973 | Waidelich | B60V 3/04 104/23.2 |
| 3,831,527 | A * | 8/1974 | Peterson | B61L 11/02 104/130.07 |
| 3,892,185 | A * | 7/1975 | Guderjahn | B60L 13/04 104/286 |
| 4,083,309 | A * | 4/1978 | Gerard | B61B 13/12 104/130.07 |
| 4,213,396 | A * | 7/1980 | Mehren | B61F 9/00 104/130.05 |
| 4,233,908 | A * | 11/1980 | Omar | B61C 11/06 104/89 |
| 4,522,128 | A * | 6/1985 | Anderson | E01B 25/28 104/130.07 |
| 4,671,185 | A * | 6/1987 | Anderson | E01B 25/28 104/130.07 |
| 5,215,015 | A * | 6/1993 | Iida | B61B 13/08 104/23.1 |
| 5,277,124 | A * | 1/1994 | DiFonso | E01B 25/28 104/130.07 |
| 6,095,054 | A * | 8/2000 | Kawano | B61B 13/04 104/139 |
| 6,308,636 | B1 * | 10/2001 | Collins | B61B 13/04 104/130.01 |
| 6,418,856 | B2 * | 7/2002 | Hossfield | B62D 1/265 104/130.01 |
| 6,450,103 | B2 * | 9/2002 | Svensson | B60L 13/06 104/120 |
| 6,857,374 | B2 * | 2/2005 | Novacek | E01B 25/28 104/119 |
| 7,644,664 | B2 * | 1/2010 | Nakao | B61B 13/04 104/243 |
| 7,827,917 | B1 * | 11/2010 | Henderson | B61B 5/02 104/130.01 |
| 8,006,625 | B2 * | 8/2011 | Yang | B61B 13/10 104/130.07 |
| 9,718,630 | B2 | 8/2017 | Bambrogan et al. | |
| 2004/0026526 | A1 * | 2/2004 | Nilsson | E01B 5/08 238/382 |
| 2009/0242576 | A1 | 10/2009 | Marcel | |

FOREIGN PATENT DOCUMENTS

DE          2544206          4/1977
DE       102 53 827          5/2004

OTHER PUBLICATIONS

Written Opinion of Int'l Searching Auth. conducted in counterpart Int'l Appln. No. PCT/US2017/068994, Form PCT/ISA/237 (dated Mar. 19, 2018).

Europe Search Report and Office Action conducted in counterpart Europe Appln. No. 17888436.7 (dated Jul. 17, 2020).

China Search Report and Office Action conducted in counterpart China Appln. No. 201780081365.3 (dated Dec. 17, 2020).

India Office Action conducted in counterpart India Appln. No. 201947025394 (dated Mar. 12, 2021).

* cited by examiner

VEHICLE GUIDANCE SYSTEM

CROSS-REFERENCE TO RELATED APPLICATION

The instant application claims the benefit under 35 U.S.C. § 119(e) of U.S. Provisional Application No. 62/440,155 filed Dec. 29, 2016, the disclosure of which is expressly incorporated by reference herein in its entirety.

BACKGROUND

1. Field of the Disclosure

The present disclosure relates to a transportation system using tracks, in particular, a vehicle guidance system and track switching system.

2. General Background and State of the Art

Transportation systems that rely on tracks for the support of their weight as well as for their guidance are well-developed and in widespread use. One example is the railroad. Train rails determine the path of travel for the train car. The mechanical device that allows railroad trains to be directed from one track to another is known as a "switch" or a "turnout." Switches are present where two tracks intersect, that is at bifurcations (also known as spurs or siding branches) where one track splits into two or more tracks going to different directions, or junctions where two or more tracks from different directions converge into a single track. Switches consist of various specialized mechanical track elements at the intersection of two tracks such as "points" (also known as "point blades" or "switch rails"), "frogs" (also known as "common crossings" or "V-rails"), guard rails, etc. The operation of a switch requires the mechanical movement of large sections of specialized track elements. Switching at high speeds (including for conventional/wheeled high-speed trains such as the French TGV or the Japanese Shinkansen) requires longer, heavier, more complex, and more expensive mechanisms. In the more extreme and rare case of very high-speed magnetic levitation (maglev) trains such as the German Transrapid system (currently in commercial operation in Shanghai), the existing mechanical switches involve enormous mechanisms moving entire sections of the tracks altogether. Whether considering conventional wheeled trains or maglev trains, these track-based switches require the mechanical movement of long and large track elements, are slow, complex, expensive, and prone to failure. Failure of a mechanical switch jeopardizes the entire transportation system, as it is a critical element in maintaining the correct direction of travel toward the train car's intended destination. Further, it can also be a source of danger and cause the train to derail with catastrophic consequences.

In conventional railroad (i.e. wheeled trains), on the track-side, each rail simultaneously supports two types of loads: normal loads due to the weight of the train, and lateral loads due to side forces. In other words, there typically is not a distinct set of rails for normal loads and a separate set of rails for lateral loads. Similarly, on the vehicle-side, the same wheels simultaneously transfer both the normal loads and the lateral loads to the tracks. In other words, there is not a distinct set of wheels and bogies to support the weight and another set of wheels and bogies to provide guidance (i.e. to transfer lateral loads to the tracks). In the case of less conventional track-based transportation systems, such as the German Transrapid maglev, on the other hand, normal and lateral loads are handled by separate mechanisms. On the track-side, there is a distinct set of levitation tracks which is separate from the guidance tracks. On the vehicle-side, there are indeed two separate sets of bogies for vertical loads (levitation) and lateral loads (guidance). Regardless of whether levitation and guidance are combined (as in conventional rail) or separate (as in Transrapid maglevs), all existing switching mechanisms rely on track-side switching, and all track-side switches rely on the mechanical movement of long and large track elements.

SUMMARY

Embodiments of the present disclosure may be used in a track-based transportation system, for example, as described in commonly-assigned application Ser. No. 15/007,783, now U.S. Pat. No. 9,718,630, titled "Transportation System," the contents of which are hereby expressly incorporated by reference herein in their entirety.

The present disclosure is related to a system for vehicle-side route switching (as opposed to the ubiquitous track-side switching). Such a system includes a switching apparatus that separates levitation (normal gravity loads) from guidance (lateral centrifugal loads). The mechanisms that handle normal loads are separated from the mechanisms that handle lateral loads using track-side components and vehicle-side components. On the vehicle-side, at least one set of levitation bogies and at least two sets of guidance bogies (one on each side of the vehicle) can be engaged by mechanical movement or electromagnetic activation. On the track-side, at least one set of levitation tracks sits completely below the vehicle, and one or two sets of guidance tracks sit on one or both sides of the vehicle, depending on whether the vehicle is going through a switch or not.

For normal loads, on the vehicle-side, there is one set of levitation bogies below the vehicle. Levitation bogies can transfer gravity/levitation loads to and from levitation tracks in any manner necessary and/or appropriate. These load-transfer devices may include contacting mechanisms such as wheels or slippers, as well as contactless mechanisms such as electromagnets, permanent magnets, air bearings, etc. Levitation bogies carry the weight of the vehicle at all times and are always engaged with levitation tracks below the vehicle.

For normal loads, on the track-side, levitation tracks sit below the vehicle with a top flat side facing the vehicle. The top side may or may not be lined with a special material lining. The lining may facilitate the load-transfer between the levitation bogies and the levitation tracks. For example, a metallic or electromagnetic lining may enable contactless load transfer to and from electromagnetic bogies, or a rubber lining may dampen vibrations while transferring loads to and from wheeled bogies, etc. Levitation tracks can coexist and intersect at common crossings as long as the vehicle fully sits above them so that no part of the vehicle cuts through them when going through the switch. This configuration ensures that neither track-side nor vehicle-side switching action will be necessary for levitation loads. Switching action will only govern the interaction of the guidance bogies and the guidance tracks.

For lateral loads, on the vehicle-side, the guidance bogies, are present on each side of the vehicle (starboard and port). Each bogie can provide bidirectional guidance support in both lateral directions. Guidance bogies can transfer the guidance lateral loads to and from the guidance tracks in any manner necessary and/or appropriate. These load-transfer devices may include contacting mechanisms such as wheels or slippers, as well as contactless mechanisms such as electromagnets, permanent magnets, air bearings, etc. Guidance bogies can engage or disengage guidance tracks by mechanical movement of the bogie assembly or by electromagnetic activation. The mechanical movement of the bogie assembly can occur via rotation, translation, or any combination thereof.

For lateral loads, on the track-side, a guidance track may be in the form of a channel with at least two side walls and one opening. The opening may be a top opening (for example a "U" channel), or a bottom opening (for example an inverted "U" channel). The inner side walls of the channel may or may not be lined with a special material lining. The lining may facilitate the load-transfer between the guidance bogies and the guidance tracks. For example, a metallic or electromagnetic lining may enable contactless load transfer to and from electromagnetic bogies, or a rubber lining may dampen vibrations while transferring loads to and from wheeled bogies, etc.

The guidance bogie and the guidance track interact with each other when the guidance bogie is engaged in its corresponding guidance track channel. When the guidance bogie and the guidance track channel are engaged, the lateral loads are exchanged between the vehicle and the track so that the vehicle will continue to travel substantially in the direction of the engaged guidance track. When a guidance bogie is disengaged from a guidance track, such as, e.g., by being physically removed from the track channel assembly by an actuator, then the vehicle is no longer being guided by that guidance track. Thus, in a system with multiple guidance bogies and tracks, the direction of travel of a vehicle can be controlled by the process of engaging and disengaging guidance bogies from corresponding guidance tracks, e.g., at bifurcations in the transportation route. If the port guidance bogie(s) is (are) engaged in the port guidance track and the starboard guidance bogie(s) is (are) disengaged from the starboard guidance track, the vehicle is directed to the port direction at a switch. Similarly, if the starboard guidance bogie(s) is (are) engaged in the starboard guidance track and the port guidance bogie(s) is (are) disengaged from the port guidance track, the vehicle is directed to the starboard direction at a switch.

In the known art, track-side switching requires large and long sections of track to move into position. Switching at high speeds, exacerbates this problem as curve radii increase, resulting in very long sections where tracks intersect and therefore longer and larger moving track elements. In addition to the above complexities, if the transportation system relies on short separation times and short separation distances between two vehicles, the time it takes for the switch to operate becomes an additional impediment. The size and mechanical complexity of track-side switching by itself is sufficiently problematic to make it inadequate for very high speeds. Adding the requirement of short separation between vehicles will require very fast-acting switches, which track-side switching might not be able to achieve. Switching becomes a critical element in such transportation systems, such that a failure of a track-side switch compromises the operation of the entire system. As the process is time-critical, this known track-side switching is impractical for a high-speed transportation system that intends to have individual vehicles traversing these common crossings or bifurcations as frequently as, e.g., every ten seconds.

Embodiments of the invention are directed to a vehicle guidance system that includes a port guidance bogie selectively positionable in a first position for direction guidance with the port guidance bogie engaged in the port guidance track imposing the port direction onto the vehicle and a second position for travel with the port guidance bogie disengaged from the port guidance track and a starboard guidance bogie selectively positionable in a third position for direction guidance with the starboard guidance bogie engaged in the starboard guidance track imposing the starboard direction onto the vehicle and a fourth position for travel with the starboard guidance bogie disengaged from the starboard guidance track. At a common crossing, one of: the port guidance bogie is selectively positioned into the second position while the starboard guidance bogie remains in its third position to effect a starboard turn, or the starboard guidance bogie is selectively positioned into the fourth position while the port guidance bogie remains in its first position to effect a port turn. Prior to reaching the common crossing, and after having cleared the common crossing, both port and starboard guidance bogies can be in their engaged positions, i.e., first and third positions, respectively. During the entire length of the common crossing, only the port or the starboard bogies must be engaged, both cannot be engaged simultaneously.

According to embodiments, the port guidance bogie can include a port assembly coupled to the vehicle via a port connecting arm, and the starboard guidance bogie can include a starboard assembly coupled to the vehicle via a starboard connecting arm.

In accordance with other embodiments, the vehicle may travel within a tube-like enclosure, or over any other guideway such as a partial tube providing support from both sides of the vehicle. The vehicle guidance system can also include a starboard and a port track channels arranged along an interior of the enclosure. The starboard track channel may be arranged to receive the starboard assembly and the port track channel may be arranged to receive the port assembly. In embodiments, the starboard and port assemblies can include at least one contacting or contactless load transfer mechanism such as active electromagnets, passive permanent magnets, wheels, air bearings, or combinations of these mechanisms. Further, the starboard and port track channels can include surface linings suited to interacting with active electromagnets, passive permanent magnets, wheels, air bearings, or combinations of these mechanisms. The surface linings can be made of metal, polymers, composites, or any other materials necessary to bear loads, reduce friction, handle thermal stresses, etc.

According to other embodiments of the invention, the vehicle can include a magnetic levitation vehicle configured to travel over a track system.

In still other embodiments, the common crossing may include a port path and a starboard path, over one of which the vehicle selectively travels. Further, to selectively travel over the port path, the starboard guidance bogie can be positioned in the fourth position, and to selectively travel over the starboard path, the starboard guidance bogie can be positioned into the second position.

According to still other embodiments, the starboard and port guidance bogies can be operable independently from each other. Further, additional guidance bogies can be arranged on port and additional guidance bogies can be arranged on starboard. The guidance bogies on starboard may be operable together and the guidance bogies on port may be operable together, and the guidance bogies on starboard may be operable independently of the guidance bogies on port.

In further embodiments, the vehicle can include an exoskeleton surrounding the fuselage of a pod, i.e. a payload compartment for passengers and/or cargo. The pod may be free to rotate within the exoskeleton along the vehicle's longitudinal axis. The levitation and guidance bogies would be connected to the exoskeleton instead of being directly attached to the pod. When the vehicle goes through a turn, the pod can rotate relative to the exoskeleton and change its bank angle along the vehicle's longitudinal axis. This pod-side banking (as opposed to the track-side banking used for the design of most railroad tracks and freeways) will automatically align the passengers and/or cargo along the direction of the combined acceleration of gravity and the lateral centrifugal acceleration. For passengers, the result is better comfort as they won't feel any lateral acceleration and are not thrown to the side of their seats. For cargo, the result is that cargo will not shift from side to side within containers during travel. For route planning and optimization, the result is the ability to bank the pod without having to bank the tracks, smaller radii of curve at higher velocities, and easier curve alignment when two tracks intersect.

In other embodiments, when the port guidance bogie is selectively positioned into the engaged position, the starboard guidance bogie can remain in the disengaged position for travel, and when the starboard guidance bogie is selectively positioned into the engaged position, the port guidance bogie can remain in the disengaged position for travel.

In accordance with still other embodiments of the invention, a process of guiding a vehicle approaching a common crossing with the vehicle guidance system can include one of: selectively positioning the port guidance bogie into the engaged position; and selectively positioning the starboard guidance bogie into the engaged position. Further, the vehicle may travel within an enclosure, the port guidance bogie can include a port assembly coupled to the vehicle via a port connecting arm, the starboard guidance bogie includes a starboard assembly coupled to the vehicle via a starboard connecting arm, and a port and a starboard track channels, which can be arranged along an interior of the enclosure, may be configured to receive the port bogie and the starboard bogie, respectively. In embodiments, the common crossing may include a starboard path and port path, over one of which the vehicle selectively travels.

Embodiments of the invention are directed to a vehicle guidance system that includes a first guidance bogie selectively positionable in a first position for travel and a second position for direction change; and a second guidance bogie selectively positionable in a third position for travel and a fourth position for direction change. At a common crossing, one of: the first guidance bogie is selectively positioned into the second position, or the second guidance bogie is selectively positioned into the fourth position.

According to embodiments, the first guidance bogie can include a first assembly coupled to the vehicle via a first connecting arm, and the second guidance bogie includes a second assembly coupled to the vehicle via a second connecting arm. The vehicle can travel at least one of within and along a guideway. Embodiments can further include a first guidance track arranged along a first side of the guideway and a second guidance track channel arranged along a second side of the guideway. The first track channel may be arranged to receive the first assembly and the second track channel may be arranged to receive the second assembly. Further, the first and second assemblies may include at least one contacting or contactless load transfer mechanism such as active electromagnets, passive permanent magnets, wheels, air bearings, or combinations thereof. The first and second guidance track channels can also be configured to interact with the first and second assemblies. The first and second track channels may include a surface lining configured to bear loads, reduce friction and/or handle thermal stresses, and these surface linings can include at least one of: metal, polymer and composite materials.

In embodiment of the invention, the vehicle can include a vehicle configured to travel over a track system.

According to other embodiments, after the common crossing, the one of: the first guidance bogie is selectively returned into the first position or the second guidance bogie is selectively returned into the third position.

In other embodiments of the instant invention, the first guidance bogie may be arranged on a port side of the vehicle and the second guidance bogie may be arranged on a starboard side of the vehicle, and the guidance bogies may be operable independently from each other. Further, the first guidance track can be arranged on a port side of the guideway and the second guidance track can be arranged on a starboard side of the guideway, and the common crossing can include a port path and starboard path, over one of which the vehicle selectively travels. Moreover, to selectively travel over the port path, the second guidance bogie can be positioned in the fourth position, and to selectively travel over the starboard path, the first guidance bogie can be positioned into the second position. In embodiments, additional guidance bogies can be arranged on the port side of the vehicle and additional guidance bogies can be arranged on the starboard side of the vehicle. The guidance bogies on the port side of the vehicle may be operable together and the guidance bogies on the starboard side of the vehicle may be operable together, and the guidance bogies on the port side of the vehicle may be operable independently of the guidance bogies on the starboard side of the vehicle According to embodiments, the vehicle may include an exoskeleton frame surrounding a pod fuselage for passengers and/or cargo. The pod can be free to rotate along the vehicle's longitudinal axis within the exoskeleton. Further, when the vehicle goes through a port or starboard direction change, the pod may change its bank angle by rotating along the vehicle's longitudinal axis relative to the exoskeleton.

According to still other embodiments, when the first guidance bogie is selectively positioned into the second position, the second guidance bogie must remain in the third position for travel, and when the second guidance bogie is selectively positioned into the fourth position, the first guidance bogie must remain in the first position for travel.

In accordance with still yet other embodiments of the present invention, a process of guiding a vehicle approaching a common crossing with any of the above-described embodiments of the vehicle guidance system may include one of: selectively positioning the first guidance bogie into the second position; and selectively positioning the second guidance bogie into the fourth position. In embodiments, the vehicle travels at least one of within and along a guideway, the first guidance bogie can include a first assembly coupled to the vehicle via a first connecting arm, the second guidance bogie can include a second assembly coupled to the vehicle via a second connecting arm, and a first and a second track channel, which are arranged along the port and starboard of the guideway, may be configured to receive the first assembly and the second assembly, respectively. The common crossing can include a port path and starboard path, over one of which the vehicle selectively travels, the first guidance bogie can be arranged on a port side of the vehicle and the second guidance bogie may be arranged on a starboard side of the vehicle, and the process further comprises one of: positioning the second guidance bogie into the fourth position to selectively travel over the port path, or positioning the first guidance bogie into the second position to selectively travel over the starboard path.

Therefore, in accordance with aspects of the disclosure, in embodiments, a vehicle-side switching system may require only vehicle-side mechanical movement of quick and small mechanisms, no track-side mechanical movement, is less prone to systemic failure, and allows for rapid redirection of successive vehicles.

BRIEF DESCRIPTION OF THE DRAWINGS

These and other features of this disclosure will be best understood by reference to the following detailed description of a preferred embodiment of the disclosure, taken in conjunction with the accompanying drawings, in which.

DETAILED DESCRIPTION

Figure 1:
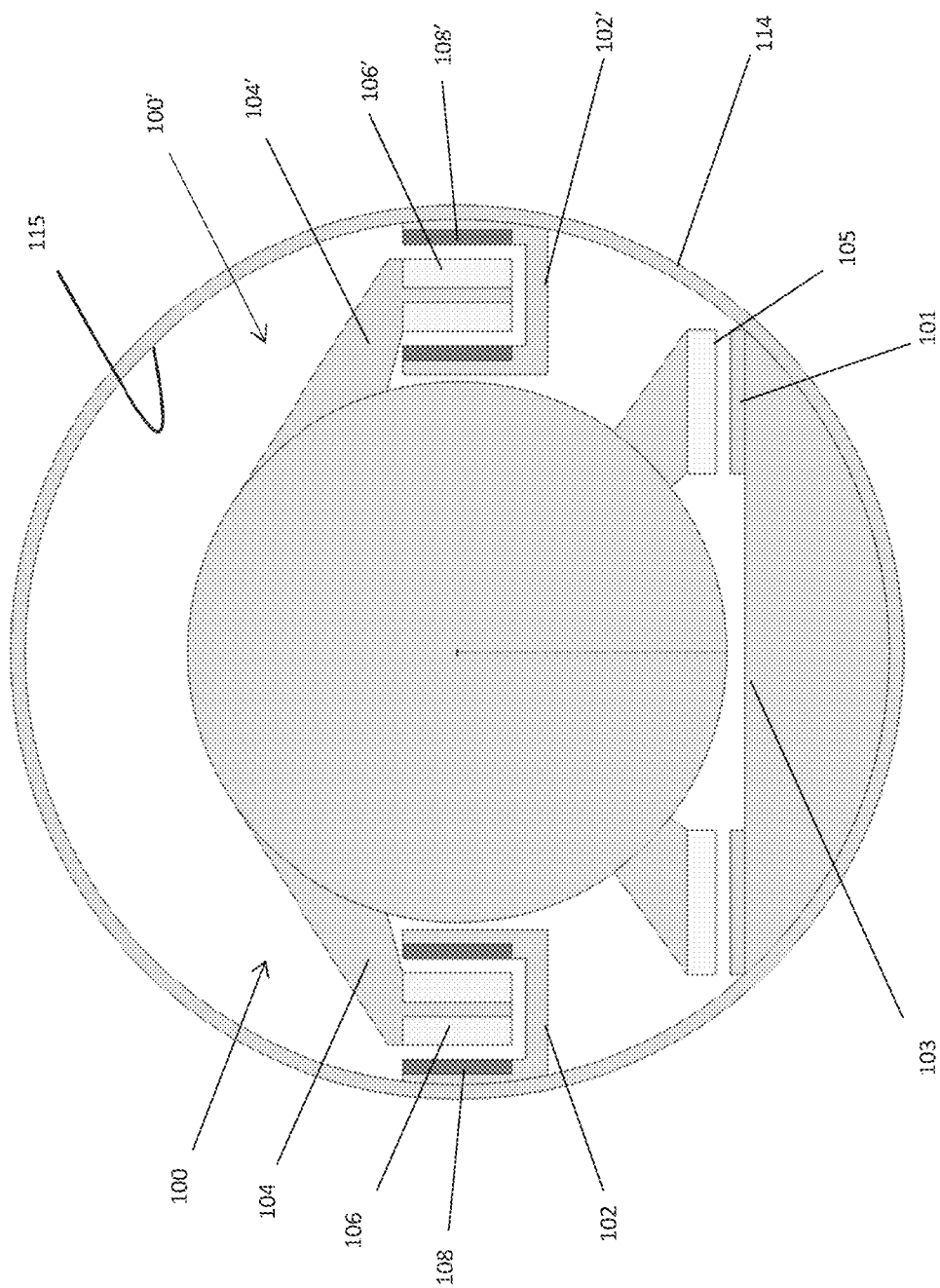
FIG. 1 depicts an exemplary dual side guidance track channels with bi-directional support of lateral loads provided by a port guidance track and a starboard guidance track

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the indefinite article "a" indicates one as well as more than one and does not necessarily limit its referent noun to the singular.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly, "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of", so that for instance "a composition comprising a compound A" may also (essentially) consist of the compound A.

The various embodiments disclosed herein can be used separately and in various combinations unless specifically stated to the contrary.

While the specification describes particular embodiments of the present disclosure, those of ordinary skill can devise variations of the present disclosure without departing from the inventive concept.

FIG. 1 shows an exemplary and non-limiting configuration of a track switching assembly for a vehicle, as viewed from the stern (rear) of the vehicle, so that the left-hand side of the drawing corresponds to port and the right-hand side (using reference numbers with primes/apostrophes) corresponds to starboard. The vehicle 112, which can be, e.g., a magnetic levitation vehicle or a wheeled vehicle, travels over tracks 101, which can be set flush with or raised above a floor 103 in a transport guideway 114 (which can be a tube, a partial tube, an elevated structure, a structure at ground level, a structure below ground, a tunnel, a bridge, etc.). Tracks 101 interact with levitation bogies 105 of vehicle 112 to effect a levitation force on which vehicle 112 as it travels through transport guideway 114 over tracks 101. In embodiments, interaction between tracks 101 and levitation bogies 105 can also effect a motive force on vehicle 112 through transport guideway 114. Additionally, or alternatively, a motive force can be exerted on vehicle 112 to move vehicle 112 through transport guideway 114.

For guidance of vehicle 112 over tracks 101 and within the transport guideway 114, the track switching assembly includes at least one first guidance bogie assembly 100, which can be located, e.g., on a port side of vehicle 112, at least one first track channel assembly (or guidance track) 102, which can be arranged on a port side of transport guideway 114, at least one second guidance assembly 100', which can be located, e.g., on a starboard side of vehicle 112, and at least one second track channel assembly 102', which can be arranged on a starboard side of transport guideway 114. First guidance assembly 100 comprises a first connecting arm 104, a first assembly 106, e.g., contactless mechanisms such as active electromagnets, passive permanent magnets, air bearings, etc. or contacting mechanisms such as wheels or slippers, etc., or combinations thereof, and an actuator (not shown), and second guidance bogie assembly 100' comprises a second connecting arm 104', a second assembly 106', e.g., contactless mechanisms such as electromagnets, permanent magnets, air bearings, etc. or contacting mechanisms such as wheels or slippers, etc., or combinations thereof, and an actuator (not shown). By way of non-limiting example, the actuators for the first and second guidance bogies can be a same actuator or separate actuators. First track channel assembly 102 comprises a third assembly 108, which may or may not be lined with special surface linings suited to interacting with active electromagnets, passive permanent magnets, wheels, air bearings, or combinations thereof of the first assembly 106, and second track channel assembly 102' comprises a fourth assembly 108', which may or may not be lined with special surface linings suited to interacting with active electromagnets, passive permanent magnets, wheels, air bearings, or combinations thereof of the first assembly 106'. Moreover, the surface linings can be made of metal, polymers, composites, or any other materials necessary to bear loads, reduce friction, handle thermal stresses, etc.

Figure 2:
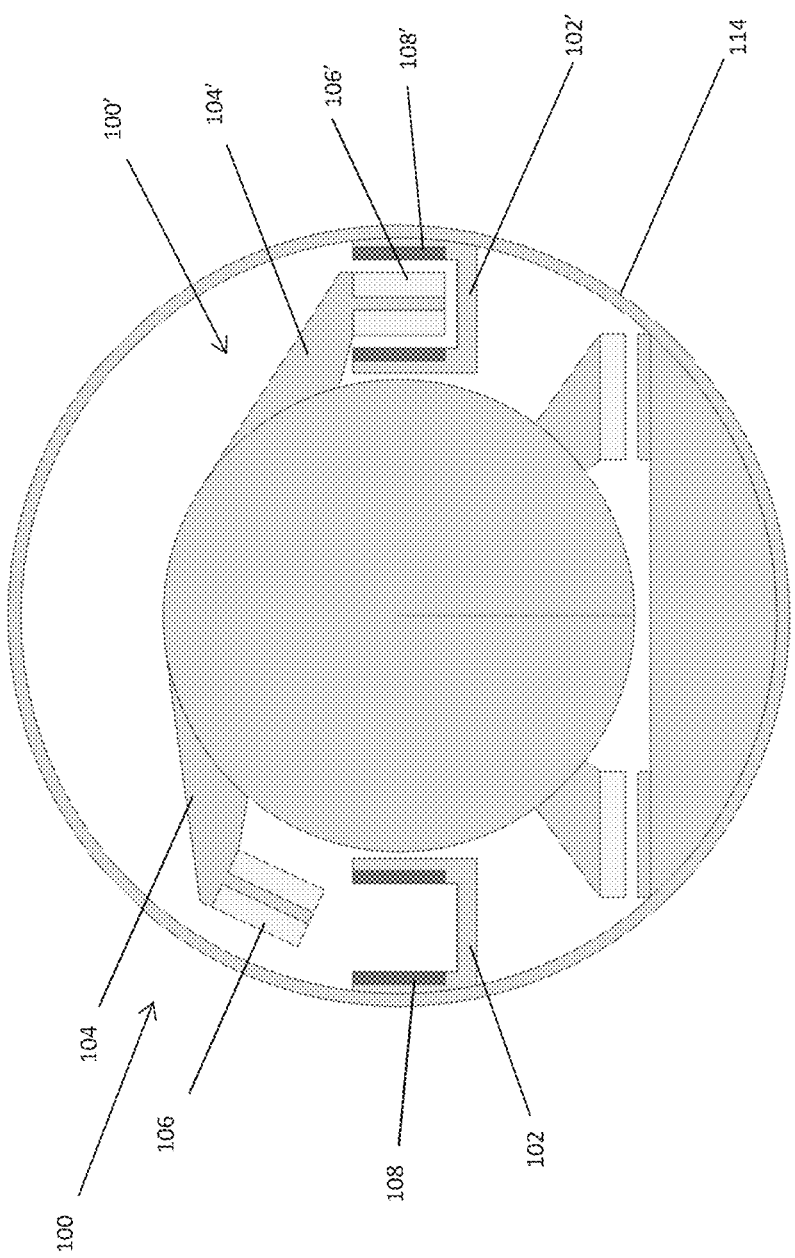
FIG. 2 depicts an exemplary vehicle seen from the stern with guidance bogies positioned to direct the vehicle to the starboard path.

FIG. 2 depicts first guidance bogie assembly 100 changing position, e.g., rotating around vehicle 112, in accordance with aspects of the disclosure. The actuator (not shown) is coupled to vehicle 112, and is preferably connected to an exoskeleton of vehicle 112 rather than to a passenger or cargo compartment or pod located within the exoskeleton, in order to effect relative, e.g., rotational, movement between first guidance bogie assembly 100 and vehicle 112 in order to substantially disengage first guidance bogie assembly 100 from first track channel assembly 102. By disengaging first guidance bogie assembly 100 from first track channel assembly 102, first assembly 106 is likewise disengaged from third assembly 108 so that these assemblies are no longer interacting with each other. When first guidance bogie assembly 100 is disengaged from first track channel assembly 102 in the manner shown in FIG. 2, vehicle 112 is guided over track 101 and through transport guideway 114 only by the still engaged second guidance bogie assembly 100' and second track channel assembly 102', whereby second assembly 106' is engaged and interacting with fourth assembly 108'.

Figure 3:
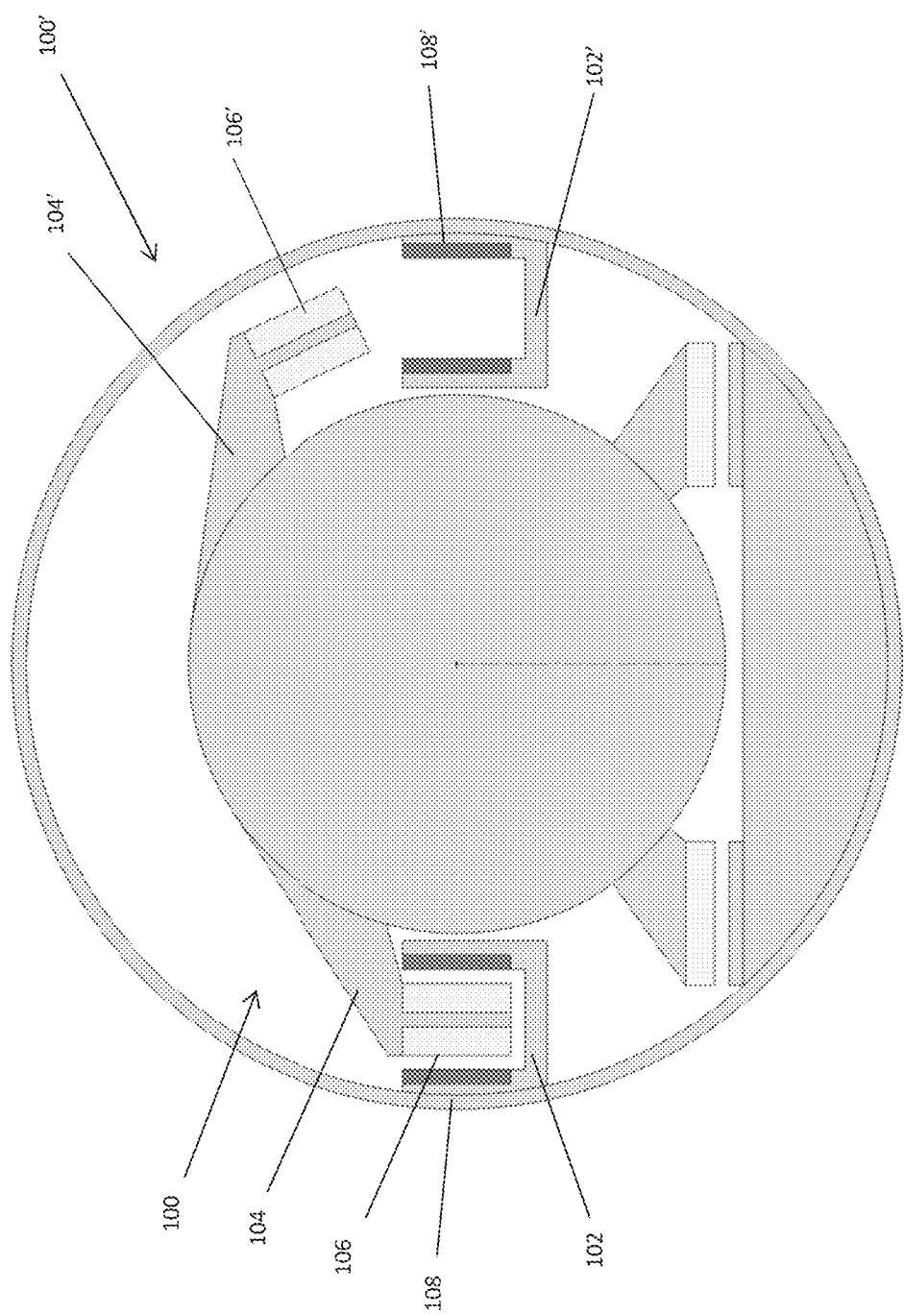
FIG. 3 depicts an exemplary vehicle seen from the stern with guidance bogies positioned to direct the vehicle to the port path.

FIG. 3 depicts second guidance bogie assembly 100' operable to move substantially away from a second track channel assembly 102' in a similar manner to the first guidance bogie assembly 100. In particular, FIG. 3 shows second guidance bogie assembly 100' changing position, e.g., rotating around an exterior of vehicle 112, in accordance with aspects of the disclosure. The actuator (not shown), which can be a same or a separate actuator from that described above in FIG. 2 as being coupled to vehicle 112, and preferably connected to an exoskeleton of vehicle 112, effects relative, e.g., rotational, movement between second guidance bogie assembly 100' and vehicle 112 in order to substantially disengage second guidance bogie assembly 100' from second track channel assembly 102'. By disengaging second guidance bogie assembly 100' from second track channel assembly 102', second assembly 106' is likewise disengaged from fourth assembly 108' so that these assemblies are no longer interacting with each other. When second guidance bogie assembly 100' is disengaged from second track channel assembly 102' in the manner shown in FIG. 3, vehicle 112 is guided over track 101 and through transport guideway 114 only by the still engaged first guidance bogie assembly 100 and first track channel assembly 102, whereby first assembly 106 is engaged and interacting with third assembly 108.

Figure 4:
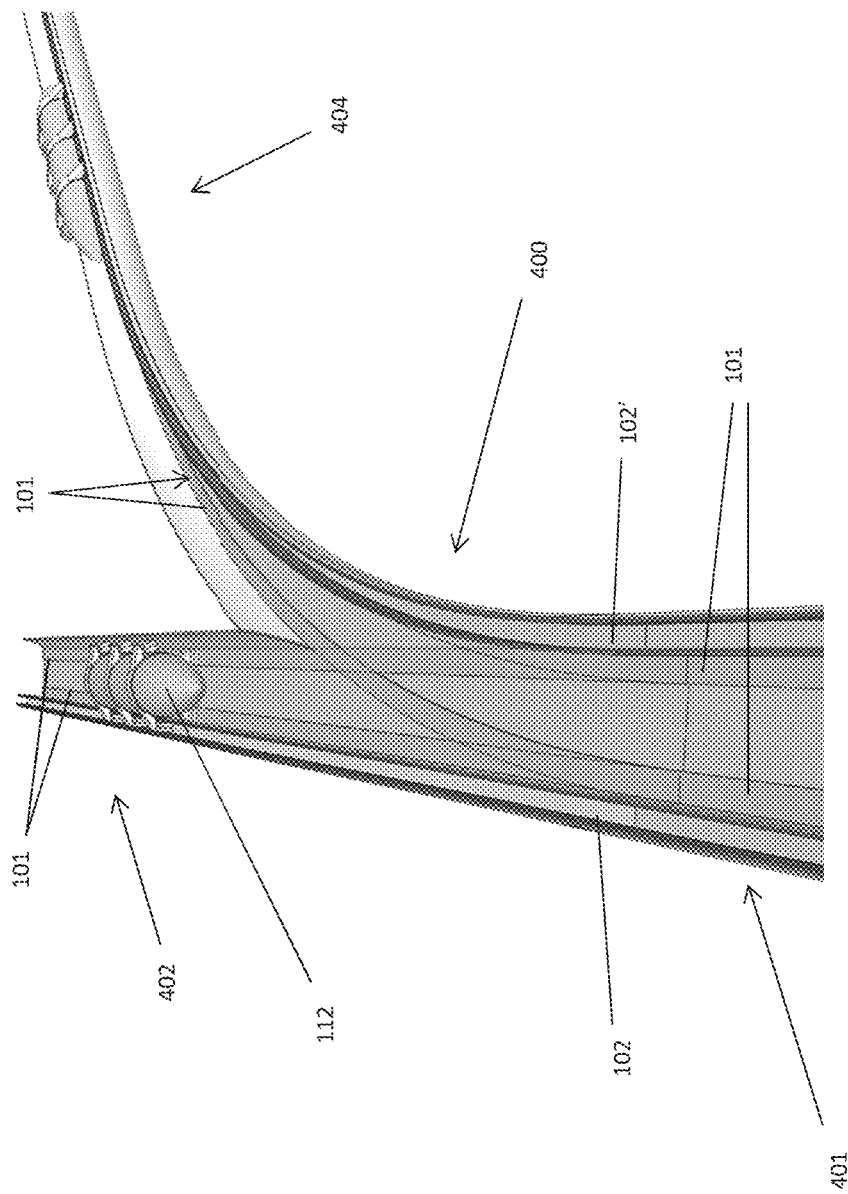
FIG. 4 depicts an exemplary sample common crossing at a bifurcation.

As illustrated in FIG. 4, transport guideway 401 of the transportation system can include a bifurcation at common crossing 400, so that vehicle 112 can either be guided along branch 402 or veer off to be guided along branch 404. Transport guideways 401, 402 and 404 generally correspond to the structure of transport guideway 114 depicted in FIG. 1. However, in a region of common crossing 400, a set of levitation tracks 101 will continue along branch 402 and another set of levitation tracks 101 will veer off from transport guideway 401 to continue along branch 404. In this way, regardless of the direction of travel imparted on vehicle 112 after switch 400, track 101 will continue to provide the levitation support for vehicle 112.

As shown in FIG. 4, first track channel assembly 102 can extend continuously through common crossing 400 along the port wall of transport guideways 401 and 402, while second track channel assembly 102' can extend continuously through common crossing along the starboard wall of transport guideways 401 and 404. After the bifurcation or after common crossing 400, second track channel assembly 102' will be provided on the starboard of transport guideway 402 and first track channel assembly 102 will be provided on the port of transport guideway 404. In this way, via disengagement of a respective guidance bogie assembly/track assembly pair, vehicle 112 can be directed to continue along a course through transport guideway 402 or can be directed to veer off through transport guideway 404. By way of non-limiting example and with reference to FIG. 1, for vehicle 112 to travel from transport guideway 401 through common crossing 400 to transport guideway 404, as vehicle 112 approaches common crossing 400, first guidance bogie assembly 100 is disengaged from first track assembly 102 while second guidance bogie assembly 100' remains engaged with second track assembly 102', so that vehicle 112 is directed to veer off into transport guideway 404. After vehicle 112 has passed the bifurcation or common crossing 400, first guidance bogie assembly 100 that was disengaged to effect the guidance of vehicle 112 through common crossing 400 can re-engage with the first track assembly 102 transport guideway 404. This re-engagement of the guidance bogie assemblies and track assemblies can additionally contribute lateral support for vehicle 112 as it travels through the transport guideways. Moreover, in embodiments, vehicle 112 may have a plurality of guidance bogie assemblies on each side in a bi-directional system.

Figure 5:
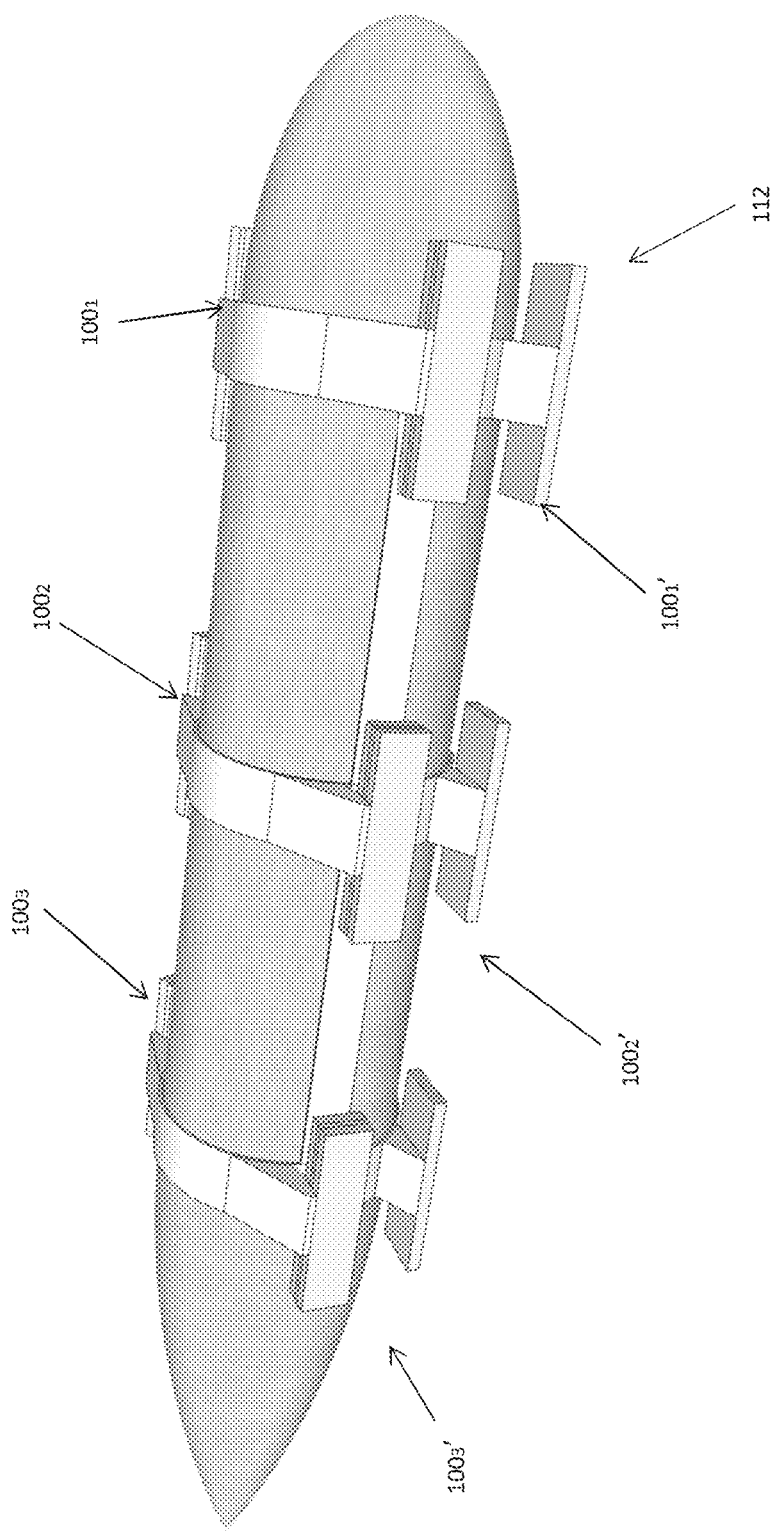
FIG. 5 depicts an exemplary vehicle with a pod fuselage within an exoskeleton attached to levitation and guidance bogies.
Figure 6:
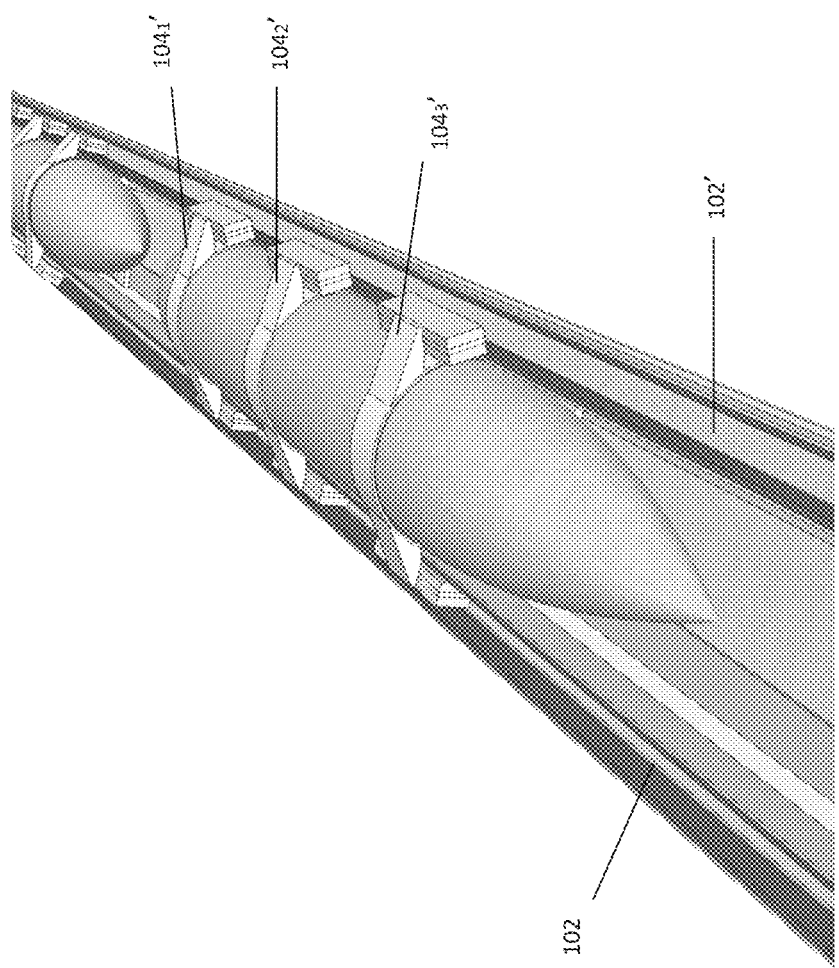
FIG. 6 depicts an exemplary vehicle with port guidance bogies engaged.
Figure 7:
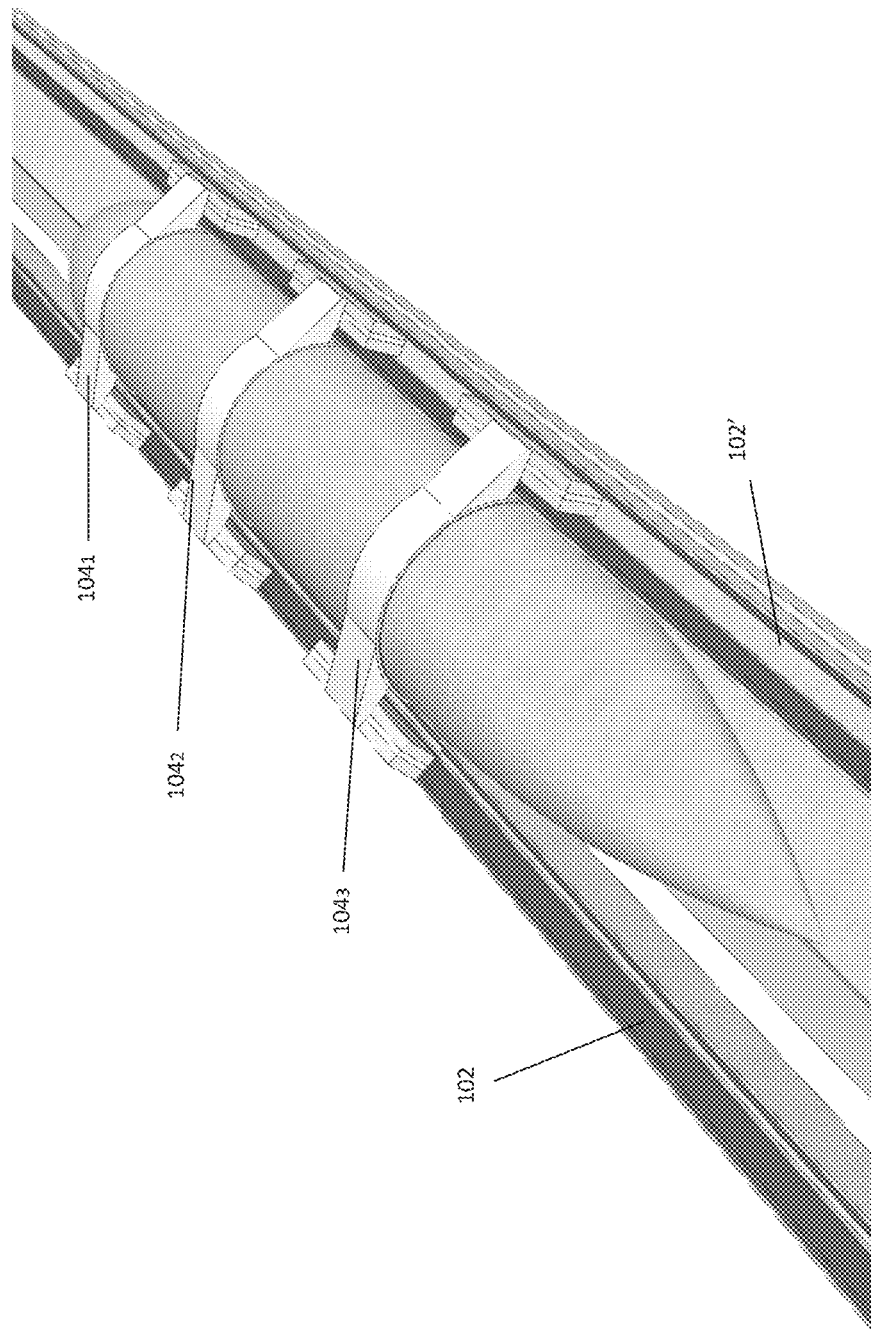
FIG. 7 depicts an exemplary vehicle with starboard guidance bogies engaged.

As shown in FIG. 5, a fuselage having a generic teardrop aerodynamic shape similar to typical passenger aircraft has a nose cone (bow) with a rounded part while the tail cone (stern) has a more elongated/pointy part. Along the length of the fuselage, a plurality of guidance bogie assemblies 100₁, 100₂, 100₃, 100₁', 100₂', 100₃' may be arranged along a length of the vehicle 112. Moreover, each guidance bogie assembly 100₁, 100₂, 100₃, 100₁', 100₂', 100₃' may be configured to move independently from each other. FIGS. 6 and 7 show vehicle 112 approaching a common crossing (not shown) and preparing for a turn. FIG. 6 depicts connecting arms 104₁', 104₂', 104₃' on the starboard side of vehicle 112 raised from track channel assembly 102', thus, preparing to bear to the port direction, i.e., the side of guidance bogie assemblies 100₁, 100₂, 100₃ interacting with track channel assembly 102 as vehicle 112 passes through an impending common crossing (not shown). Conversely, FIG. 7 depicts connecting arms 104₁, 104₂, 104₃ on the port side of vehicle 114 raised from track channel assembly 102, thus, preparing to bear to the starboard direction, i.e., the side of guidance bogie assemblies 100₁', 100₂', 100₃' interacting with track channel assembly 102' as vehicle 112 passes through an impending common crossing (not shown).

Figure 8:
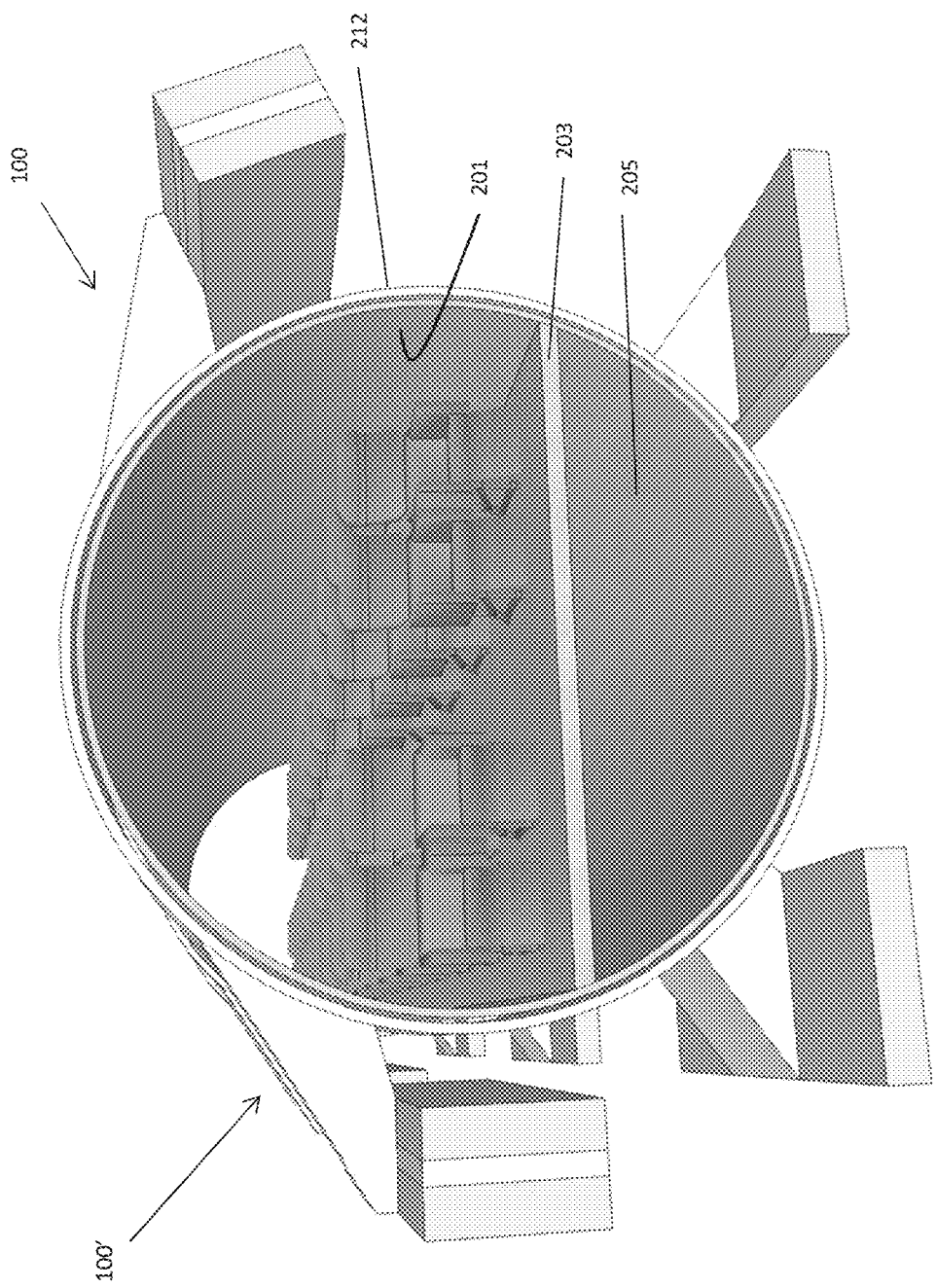
FIG. 8 depicts an exemplary configuration of a passenger pod with nose cone removed to show the seating arrangement.

Still further, while the plurality of guidance bogie assemblies 100₁, 100₂, 100₃, 100₁', 100₂' 100₃' can be provided on the exterior of vehicle 112, as shown in FIG. 5, vehicle 112 and guidance bogie assemblies 100₁, 100₂, 100₃, 100₁', 100₂' 100₃' may form an exoskeleton or outer frame 212 in which a pod is free to rotate along its longitudinal axis, e.g., for transporting people and/or cargo. FIG. 8 illustrates an embodiment in which a pod fuselage/shell 201 is arranged within the exoskeleton formed by at least an outer frame 212 of vehicle 112 and the guidance bogie assemblies. By way of non-limiting example, pod 201 may have a diameter of 3.75 m, which would be sufficient to allow single aisle 2+2 business class seating for 40 passengers within pod 201. Moreover, pod 201 can be provided with a floor 203 on which the passenger seating is connected. Floor 203 can be a load-bearing structure that could enable a "double-bubble" pressure vessel configuration as in passenger aircraft. Further, section 205 below the floor can be provided for storage, such as luggage, cargo, etc.

Figure 9:
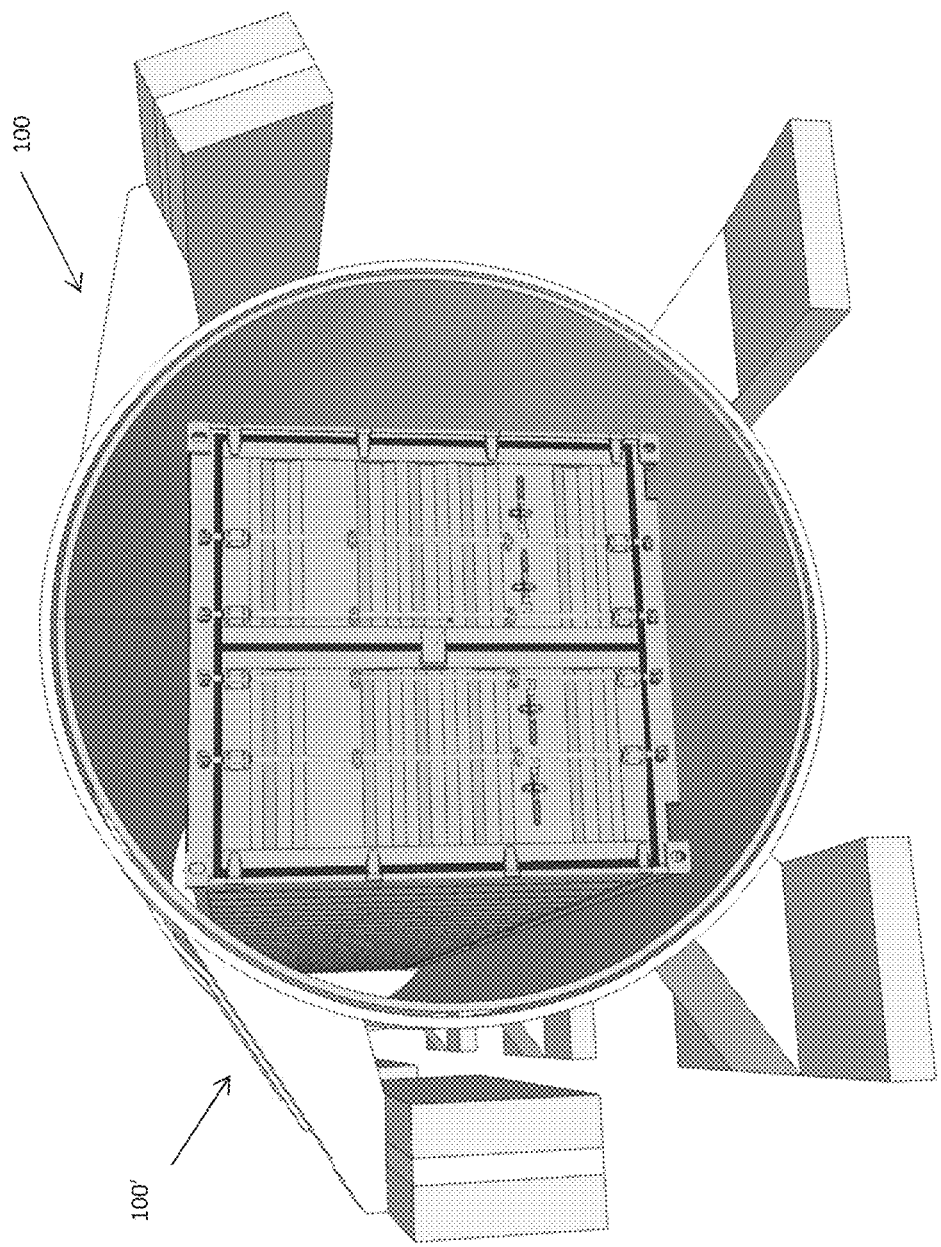
FIG. 9 depicts an exemplary configuration of a cargo pod with nose cone removed to show a cargo container.

As illustrated in FIG. 9, pod 201, arranged within the exoskeleton formed by at least an outer frame 212 of vehicle 112 and the guidance bogie assemblies, can have a diameter of, e.g., 3.75 m, which corresponds to the diameter of the exemplary pod 201 depicted in FIG. 8 and which is sufficient to hold and transport a standard maritime container.

Figure 10:
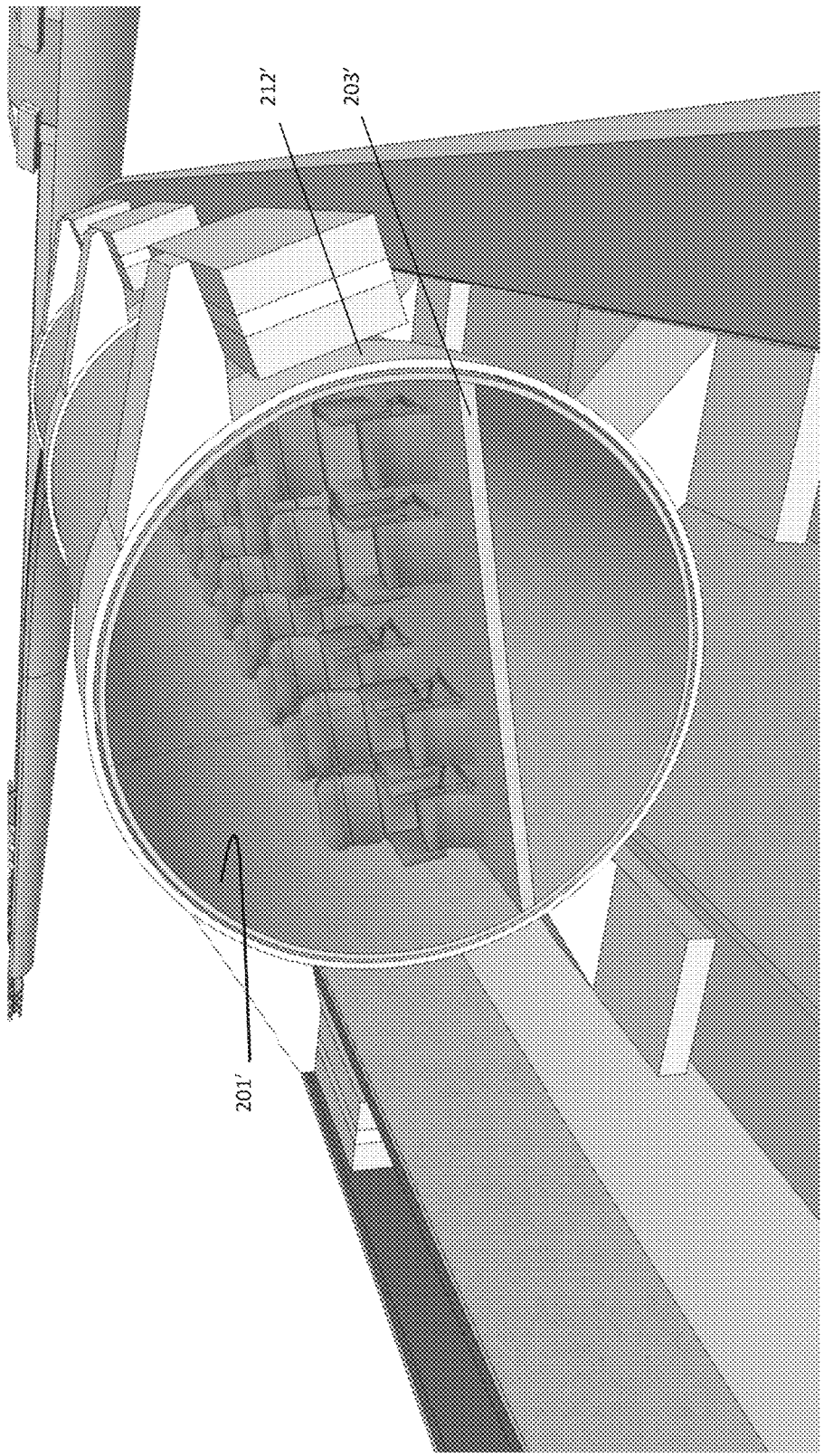
FIG. 10 depicts an exemplary configuration of a vehicle going through a turn showing a banked pod within an unbanked exoskeleton.

In the known art of transporting people and/or cargo via rail, when the train is to make a turn, the tracks are banked to counteract the centrifugal force on the train moving through the turn, thereby avoiding derailment. However, referring again to FIG. 4, tracks 101 approaching the common crossing 400 and through the common crossing into partially illustrated transport guideways 402' and 404' remain flat. As vehicle 112 make the turn through common crossing 400 into transport guideway 404', centrifugal forces will be exerted on, not only the pod, but also on the passengers and/or cargo being transported. To address these forces, pod 201', as shown in FIG. 10, can be configured for at least limited rotation within shell 212'. In particular, as vehicle 112 makes a turn, pod 201' can rotate within outer frame 212' to transform lateral centrifugal forces into additional perceived downward force in the tilted reference frame of the banked pod and zero perceived lateral force in that same reference frame. As pod 201' rotates, the passengers, rather than being thrown to the left or right by the vehicle's turning, continue to ride comfortably, as if riding in an aircraft making a turn. By way of non-limiting example, pod 201' can be coupled to outer frame 212' via bearings, e.g., cylindrical bearings, spherical bearings, air bearings, magnetic bearings, etc., to enable the desired relative rotation. By this configuration, in a port turn, the levitation bogies underneath the vehicle transfer the weight of the vehicle to the perfectly horizontal (unbanked) levitation tracks, while the starboard guidance bogies transfer the centrifugal lateral forces to perfectly vertical guidance tracks. Consequently, the passenger compartment is banked naturally along the combined acceleration of gravity and centrifugal forces in such a way that passengers do not perceive any lateral acceleration in their tilted frame of reference;

By way of non-limiting example, pod 201' can be freely rotatable in outer frame 212'. If center of gravity of pod 201' is kept below the center of rotation, pod 201' will rotate naturally and re-center itself automatically in the transport guideway following the turn. Additionally, heavier items such as luggage, electronics, environmental control and life support systems, etc. can be placed below the center of rotation (for example below the floor) as a counterbalance to further assist pod 201' in re-centering itself in the transport guideway. In other embodiments, stops (not shown) can be provided on pod 201' and inside outer shell 212' to limit the rotation of pod 201' within outer frame 212'.

System Environment

Aspects of embodiments of the present disclosure (e.g., control systems for the vehicle guidance system) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet,
a magnetic storage device
a USB key, and/or
a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present disclosure may be embodied in a field programmable gate array (FPGA).

Figure 11:
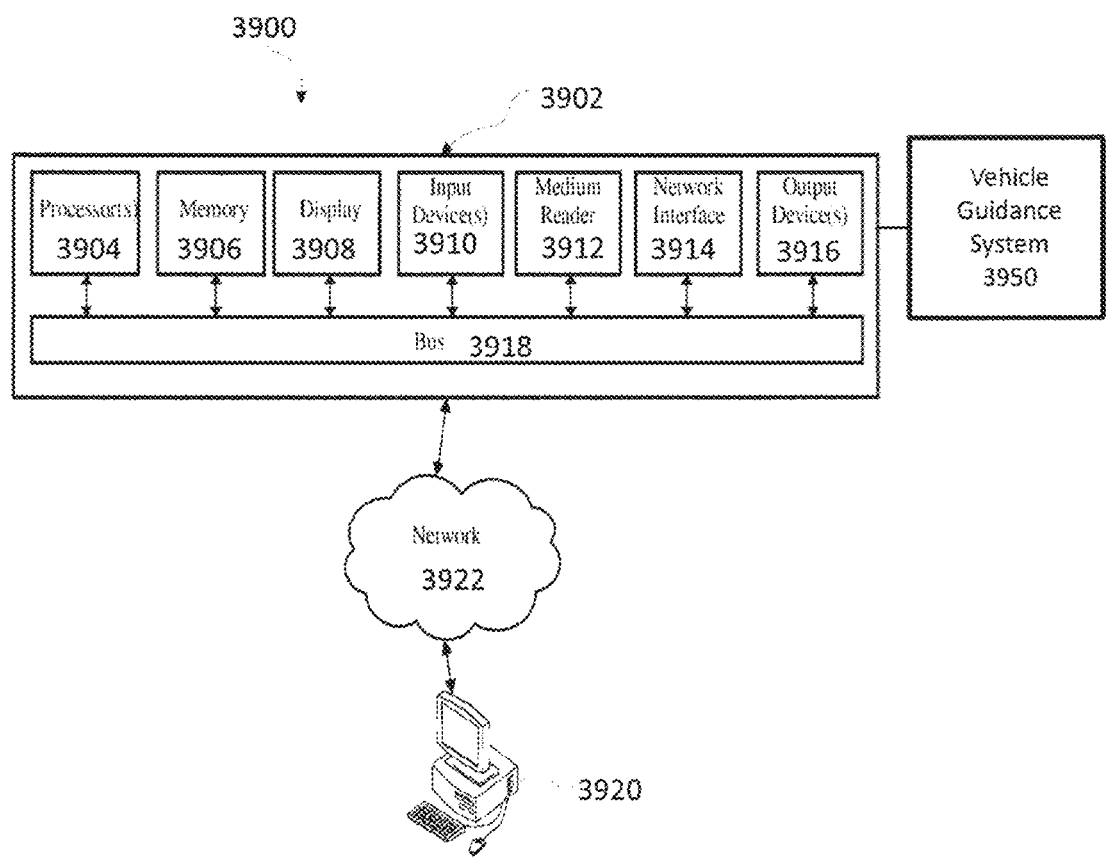
FIG. 11 shows an exemplary system for use in accordance with the embodiments described herein.

FIG. 11 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks or cloud environment. As shown in FIG. 11, system 3900 includes a vehicle guidance system 3950 in communication with the computer system 3902, and operable to control aspects of the track switching components.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 11, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 11, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof.

Figure 12:
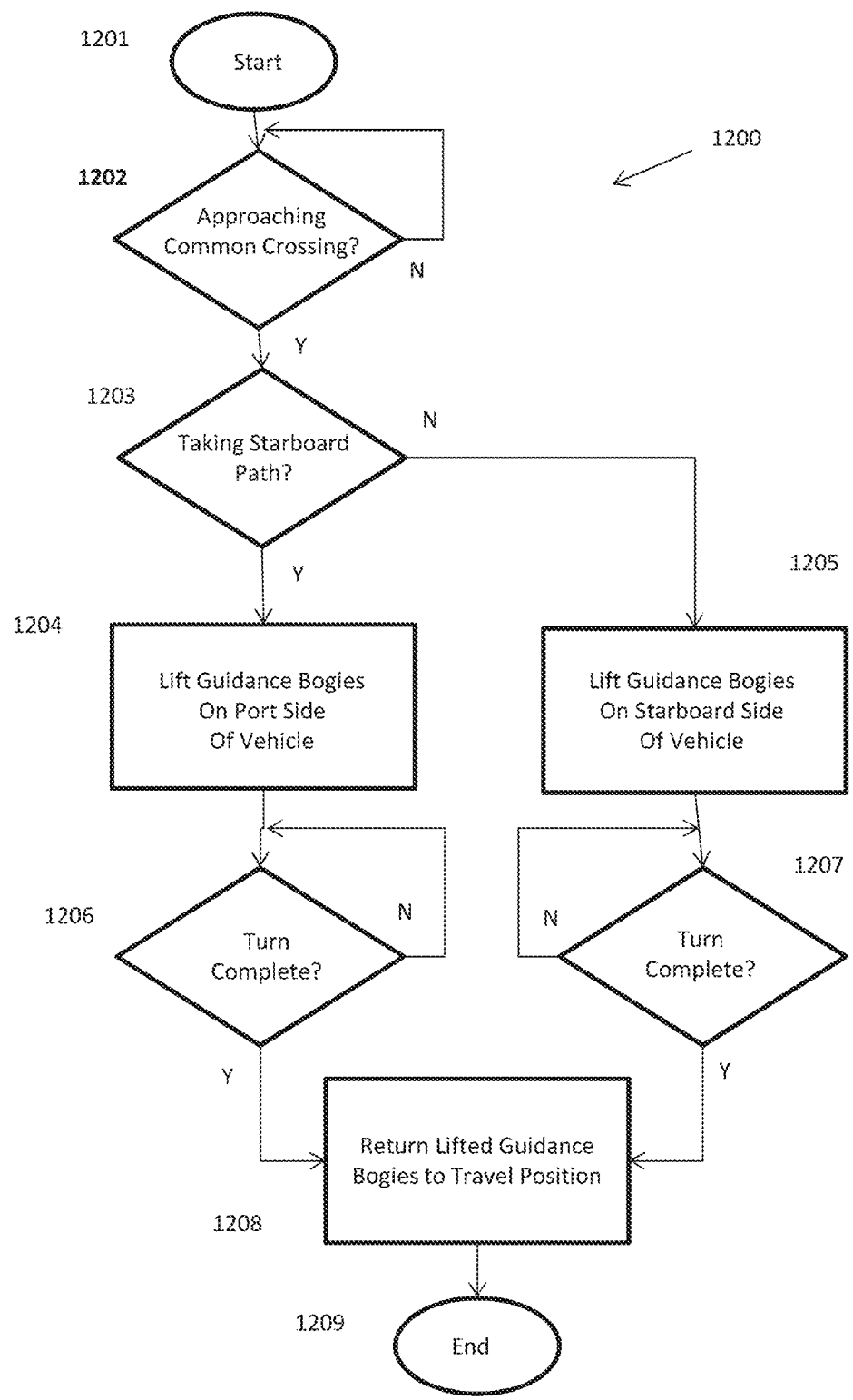
FIG. 12 shows an exemplary flow diagram for a process for vehicle guidance.

By way of non-limiting example, FIG. 12 shows an exemplary flow diagram of a process 1300 for guiding a vehicle through a common crossing, such as shown in FIG.

4. The process begins at 1201, as the vehicle is traveling along a predetermined path. At 1202, a determination is made whether the vehicle is approaching a common crossing. This determination can be made from, e.g., the vehicle passing a sensor in the transport guideway, monitoring the progress of the vehicle along its predetermined path, etc. If not approaching a common crossing, the process returns to continue waiting for an approach to a common crossing. If a common crossing is approaching, the process at 1203 can determine whether a starboard path (or a port path) is to be taken. When the path is predetermined, this inquiry would be readily answered. In the event that an operator is driving the vehicle, the process can allow for user interaction for selecting directions.

When the vehicle is taking the starboard path of the common crossing, the guidance bogie(s) on the port side of the vehicle are lifted at 1204, thereby decoupling the assemblies on the lifted guidance bogies from the respective track channel. In contrast, when the vehicle is taking the port path of the common crossing, the guidance bogie(s) on the starboard side of the vehicle are lifted at 1205, thereby decoupling the assemblies on the lifted guidance bogies from the respective track channel. Depending upon the path taken, the process at 1206 or 1207 determines whether the turn is complete. If the turn has not yet been completed, the process will wait until completion. Once it is determined that the turn is complete, the lifted guidance bogies will be returned to their travel positions at 1208 so that the assemblies are again coupled within the respective track channel. Thereafter, the process ends at 1209.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 11. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present disclosure, those of ordinary skill can devise variations of the present disclosure without departing from the inventive concept.

Insofar as the description above and the accompanying drawing disclose any additional subject matter that is not within the scope of the claims below, the embodiments are not dedicated to the public and the right to file one or more applications to claim such additional embodiments is reserved.

What is claimed:

1. A vehicle guidance system for a vehicle, comprising:
    a first guidance bogie, which is arranged on a first lateral side of the vehicle to rotate about a first part of an upper surface of the vehicle, that is selectively positionable in a first position for travel and a second position for direction change; and
    a second guidance bogie, which is arranged on a second lateral side of the vehicle opposite the first side to rotate about a second part of the upper surface of the vehicle, that is selectively positionable in a third position for travel and a fourth position for direction change,
    wherein, at a common crossing, one of:
        the first guidance bogie is selectively rotatable around the first part of the upper surface of the vehicle to be positioned into the second position lateral to the first lateral side of the vehicle, or
        the second guidance bogie is selectively rotatable around the second part of the upper surface of the vehicle to be positioned into the fourth position lateral to the second lateral side of the vehicle.

2. The vehicle guidance system according to claim 1, wherein the first guidance bogie includes a first assembly coupled to the vehicle via a first connecting arm, and wherein the second guidance bogie includes a second assembly coupled to the vehicle via a second connecting arm.

3. The vehicle guidance system according to claim 2, wherein the vehicle travels at least one of within and along a guideway.

4. The vehicle guidance system according to claim 3, further comprising a first guidance track channel arranged along a first side of the guideway and a second guidance track channel arranged along a second side of the guideway, wherein the first track channel is arranged to receive the first assembly and the second track channel is arranged to receive the second assembly.

5. The vehicle guidance system according to claim 4, wherein the first and second assemblies comprise at least one contacting or contactless load transfer mechanism such as active electromagnets, passive permanent magnets, wheels, air bearings, or combinations thereof.

6. The vehicle guidance system according to claim 5, wherein the first and second guidance track channels are configured to interact with the first and second assemblies.

7. The vehicle guidance system according to claim 6, wherein the first and second track channels comprise a surface lining configured to bear loads, reduce friction and handling thermal stress.

8. The vehicle guidance system according to claim 7, wherein the surface linings comprise at least one of: metal, polymer and composite materials.

9. The vehicle guidance system according to claim 4, wherein the first guidance track channel is arranged laterally to the guideway on the first side of the guideway and the second guidance track channel is arranged laterally to the guideway on the second side of the guideway.

10. The vehicle guidance system according to claim 4, wherein the guideway guides the vehicle between a first wall located laterally to the guideway on the first side of the guideway and a second wall is located laterally to the guideway on the second side of the guideway, and
wherein the first guidance track channel is attached to the first wall and the second guidance track channel is attached to the second wall.

11. The vehicle guidance system according to claim 1, wherein the vehicle comprises a vehicle configured to travel over a track system.

12. The vehicle guidance system according to claim 1, wherein, after the common crossing, the one of:
the first guidance bogie is selectively returned into the first position or
the second guidance bogie is selectively returned into the third position.

13. The vehicle guidance system according to claim 1, wherein the first guidance bogie is arranged laterally to a port side of the vehicle and the second guidance bogie is arranged laterally to a starboard side of the vehicle, and the guidance bogies are operable independently from each other.

14. The vehicle guidance system according to claim 13, wherein a first guidance track is arranged on a port side of the guideway and a second guidance track is arranged on a starboard side of the guideway, and
wherein the common crossing comprises a port path and starboard path, over one of which the vehicle selectively travels.

15. The vehicle guidance system according to claim 14, wherein, to selectively travel over the port path, the second guidance bogie is positioned in the fourth position, and
wherein, to selectively travel over the starboard path, the first guidance bogie is positioned into the second position.

16. The vehicle guidance system according to claim 13, wherein additional guidance bogies are arranged on the port side of the vehicle and additional guidance bogies are arranged on the starboard side of the vehicle,
wherein the guidance bogies on the port side of the vehicle are operable together and the guidance bogies on the starboard side of the vehicle are operable together, and the guidance bogies on the port side of the vehicle are operable independently of the guidance bogies on the starboard side of the vehicle.

17. The vehicle guidance system according to claim 1, wherein the vehicle comprises an exoskeleton frame surrounding a pod.

18. The vehicle guidance system according to claim 17, wherein the pod is free to rotate along the vehicle's longitudinal axis within the exoskeleton.

19. The vehicle guidance system according to claim 18, wherein, when the vehicle turns, the pod rotates along the vehicle's longitudinal axis relative to the exoskeleton.

20. The vehicle guidance system according to claim 1, wherein, when the first guidance bogie is selectively positioned into the second position, the second guidance bogie remains in the third position for travel, and
when the second guidance bogie is selectively positioned into the fourth position, the first guidance bogie remains in the first position for travel.

21. A process of guiding a vehicle approaching a common crossing with the vehicle guidance system according to claim 1, the process comprising:
one of:
rotating the first guidance bogie around the first part of the upper surface of the vehicle to selectively position the first guidance bogie into the second position lateral to the first lateral side of the vehicle; and
rotating the second guidance bogie around the second part of the upper surface of the vehicle to selectively position the second guidance bogie into the fourth position lateral to the second lateral side of the vehicle.

22. The process according to claim 21, wherein the vehicle travels at least one of within and along a guideway,
wherein the first guidance bogie includes a first assembly coupled to the vehicle via a first connecting arm,
wherein the second guidance bogie includes a second assembly coupled to the vehicle via a second connecting arm, and
wherein a first and a second track channel, which are arranged along the port and starboard of the guideway, are configured to receive the first assembly and the second assembly, respectively.

23. The process according to claim 22, wherein the common crossing comprises a port path and starboard path, over one of which the vehicle selectively travels, the first guidance bogie is arranged on a port side of the vehicle and the second guidance bogie is arranged on a starboard side of the vehicle, and the process further comprises one of:
positioning the second guidance bogie into the fourth position to selectively travel over the port path, or
positioning the first guidance bogie into the second position to selectively travel over the starboard path.

24. The vehicle guidance system according to claim 1, wherein the first guidance bogie and the second guidance bogie are operable independently of each other.

25. The vehicle guidance system according to claim 1, wherein the first guidance bogie is configured to pivotably extend from the first lateral side of the vehicle to rotate around the first part of the vehicle as the first guidance bogie moves between the first position and the second position, and the second guidance bogie is configured to pivotably extend from the second lateral side of the vehicle to rotate around the second part of the vehicle as the second guidance bogie moves between the third position and the fourth position.

* * * * *